March 7, 1939.  N. C. PRICE  2,149,545
ELECTRIC PUMP
Filed Dec. 1, 1937
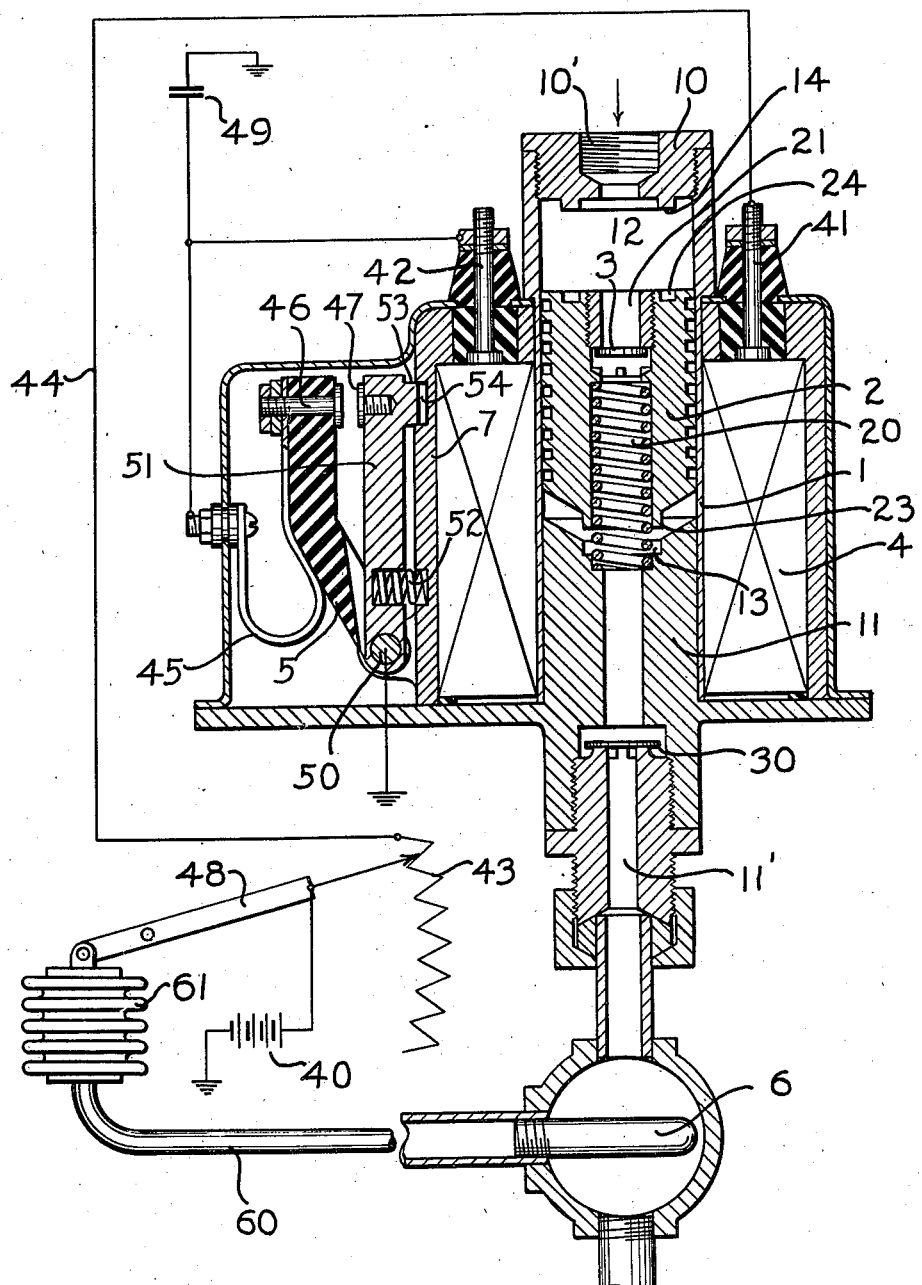
Inventor
Nathan C. Price
By Charles L. Reynolds
Attorney Patented Mar. 7, 1939

2,149,545

UNITED STATES PATENT OFFICE 2,149,545

ELECTRIC PUMP

Nathan C. Price, Seattle, Wash., assignor to Boeing Aircraft Company, Seattle, Wash., a corporation of Washington Application December 1, 1937, Serial No. 177,527

6 Claims. (Cl. 103—53)

The present invention is directed to a pump for circulating liquid, particularly in sealed or closed circulating systems, such as are employed in heating or heat transferring systems upon airplanes. Such a pump is employed or useful, for instance, in the cabin heating system disclosed in my copending application Serial No. 160,372, filed August 23, 1937, and in my copending application for a Galley heating system, Serial No. 17,526, filed December 1, 1937.

For use upon airplanes, lightness in weight is an essential, coupled with ability to deliver a sufficient quantity at a required pressure. The pressure requirements may vary considerably between just sufficient to overcome the pressure drop in a circulating system to pressure required to force a liquid through a high pressure series tube boiler. The displacement requirements may likewise vary, as in a galley system, between points of zero or nearly zero displacement when the galley is shut down, to a large or maximum displacement when the galley is operating at full capacity.

A further requirement for airplane use is reliability and freedom from servicing requirements.

It is also frequently desirable in airplane installations that the circulating system be sealed, to the end that water or other liquid may not escape, and the pump employed should be, insofar as possible, without any external connections to the plunger whatsoever, so that the liquid may pass through the pump without any possibility of leakage through packing. A positive displacement pump is preferable in such systems, yet a positive displacement pump generally entails a piston rod which projects through packing, leaving thereby the possibility of escape of liquid or vapor through the packing. Pulsating diaphragm or autosyn pumps are used in a sealed system, but are subject to the objections, among others, that their displacement rate and range, and their maximum pressure capability, are low.

It is an object of the present invention to devise a displacement pump which will meet the above requirements, for use in such systems as mentioned, or for general use, and which in addition to being simple, completely closed and leak-proof, free from service requirements, and light, will require a minimum of power to operate it, which will produce appreciable maximum pressures, which will have a readily variable capacity, and which may be subject conveniently to automatic control, under the influence of a change in some physical characteristic of the fluid being pumped, as for instance, its temperature or pressure.

A further object is to provide such a pump which, because it may be necessary to install it in spaces adjacent a passenger compartment, will be quiet, and will operate with the minimum of noise from reciprocating parts.

With these and other objects in mind, as will appear hereafter, my invention comprises the novel pump, and the novel parts and combinations thereof, as shown in the accompanying drawing, described in this specification, and more particularly defined by the claims which terminate the same.

In the accompanying drawing I have shown my invention in a preferred form.

The figure is an axial section through the pump and associated parts, with the control system shown in diagrammatic form.

The fluid is passed in a single direction through a conduit defined in part by the tube 1. At each end this tube is provided with a stop or closure, as indicated by the plugs 10 and 11, having connections at 10' and 11', respectively, for inlet and discharge of water. There are no other openings into the chamber 12 thus defined, and the fluid being pumped passes through the casing 1 in the direction indicated by the arrows.

The fluid is advanced by a reciprocable plunger 2 received within the chamber 12 and reciprocable between limits defined by the plugs 10 and 11. Suitable means, such as a compression spring 20, seated at one end upon the plug 11 and at its other end upon a shoulder within the piston 2, urges the piston toward one limit of its movement as defined by the plug 10. The piston has a through bore, preferably axially disposed, and indicated at 21, through which fluid flows between the inlet and discharge ports. An inlet valve 3 and an outlet valve 30 control the admission and discharge of fluid and its passage through the pump. The plunger 2 is provided with suitable circumferential sealing grooves, or is otherwise sealed about its periphery within the tubular casing 1.

The plunger 2 is completely free within the chamber 12, and devoid of any physical external connections. It is formed of magnetic material, the tube 1 being of nonmagnetic material, and an electromagnetic coil 4 surrounds the tube 1, the closure 11 being preferably also of magnetic material, and upon energizing the coil 4 the plunger 20 is attracted toward the closure 11 in opposition to the spring 20 or other force, latent or active, urging it towards the closure 10. If now the circuit through the coil 4 be broken, the plunger will rebound under the influence of the spring 20, and if the current be again closed the plunger will be again brought toward the closure 11, thus accomplishing a pumping action. It is only necessary, therefore, to provide suitable automatic make and break means in the circuit to the coil 4, in order to accomplish a pumping action.

As will now be apparent, the fluid-advancing force may be either the spring's force or the magnetic attraction, or magnetic attraction may be employed to move it in both directions, by suitable arrangement and alternate energization of electromagnets to this end.

Current from a grounded battery 40 or other power source is fed to the terminal 41 of the coil, preferably through a rheostat 43 or similar device for altering a characteristic of the current, by way of a lead 44. From the opposite terminal 42 of the coil the current is again grounded past a condenser 49 and also through a spring conductor 45 leading to a contact 46 carried upon an arm 5 of insulating material pivoted at 50 upon the side of the electromagnet casing, when this contact 46 makes contact with a complemental contact point 47 carried upon a grounded conductive arm 51, which is of magnetic material. A spring 52 urges the arm 50 towards the arm 5, whereby the contact points 46 and 47 are engaged, but the arm 51, upon energization of the electromagnet coil 4, is attracted toward the latter, thereby breaking contact between 46 and 47, and deenergizing the coil.

The rapidity of the make and break between contacts 46 and 47 determines the pumping rate of the plunger 2. This pumping rate can therefore be varied by varying the rate of make and break, and as this is a function of a characteristic of the current it can be varied by means of adjustment of the arm 48 of the rheostat 43 or by means of adjustment of the capacity of the condenser 49. Such adjustment might be manual, but can be controlled automatically, in accordance with any condition to be controlled, as by variation in a physical characteristic of the fluid being pumped. For instance, a bulb 6 disposed to be influenced by the fluid being pumped may be sensitive to the change in a physical property of the fluid, as for instance, its temperature or pressure. This bulb 6 being connected through a conduit 60 to a pressure bellows 61, and the control system being liquid-filled, rise in temperature of the fluid flowing past the bulb 6 effects expansion of the liquid and consequent expansion of the bellows 61, thereby shifting the pivoted rheostat arm 48, and varying the characteristics of the current supplied to the electromagnet coil 4.

The arms 5 and 51 are pivoted about the common pivot 50, hence they may move together. When the contact point 47 is in contact with the contact point 46 the circuit through the coil is completed, and as stated above, the magnetic armature arm 51 is attracted to the casing 7, and the circuit is broken. As the arm 51 rebounds under the influence of the spring 52, or any equivalent force, the contact points 47 and 46 again come together. If the point 46 were solidly fixed in position, the point 47 might rebound therefrom before the coil had become energized. Therefore, by supporting the point 46 yieldingly, the two points 47 and 46 remain in contact for an appreciable period, during rebound of the arm 51 and during return of the two arms as the armature arm 51 is again attracted towards the casing 7 and the arm 5 is returned by its spring 45. This contact over an appreciable period assures that the coil 4 will be energized, and prevents chattering or malfunctioning of the pump. It has been found to operate most smoothly when the arm 51 moves to the left of its point of engagement with the arm 5 about as far as it moves to the right of that point. The periodicity of the pump might be varied by altering the periodicity of one or both of the springs 45 and 52, as by more or less damping of the spring 45, instead of by the rheostat 43 or other electrical means suggested above. The electric control is preferred, however.

The arm 51 is provided with a projection 53, and the magnetic casing 7, which surrounds the coil 4, is provided with a pocket 54 of a size and shape to closely receive the projection 53. The projection 53, as it enters the pocket 54, traps air within the pocket, and this serves to cushion and check the advance of the arm 51, and also to retard somewhat its rebound, acting as a dashpot. In addition it acts to stop the movement of the arm 51 without noise, and thereby materially quiets the operation of the pump.

The same cushioning principle may be employed in connection with the reciprocation of the plunger 2. This is provided with a forward projection 23 at one end, and the closure at this end is provided with a pocket 13 to closely receive the projection 4, and as before, to trap fluid within the pocket, and to act to check the movement of the piston in this direction without appreciable noise. The plunger may be provided with a similar projection at the opposite end, or, as shown, with a recess 24, to receive and to closely embrace a projection 14 on the closure 10. The projections 23 and 14 and the corresponding pockets are preferably coaxial with the plunger 2, so that they will seat properly in any rotated position of the plunger.

What I claim as my invention is:

1. In combination with a nonmagnetic cylindrical conduit, a closure for each end thereof, each having a connection for the supply and discharge, respectively, of fluid, an axially bored plunger of magnetic material loose within and reciprocable lengthwise of the conduit, means urging said plunger against one such closure, an electromagnetic coil surrounding the conduit, and when energized pulling the plunger in the opposite direction, valve means to restrict flow through the plunger and conduit to a single direction, automatic intermittent make-and-break means to repeatedly energize said coil, and an extension projecting axially from an end of the plunger, the closure at such end having a registering recess closely receiving said projection, to trap liquid as a cushion to check movement of the plunger.

2. In combination with a nonmagnetic cylindrical conduit, a closure for each end thereof, each having a connection for the supply and discharge, respectively, of fluid, an axially bored plunger of magnetic material loose within and reciprocable lengthwise of the conduit, means urging said plunger against one such closure, an electromagnetic coil surrounding the conduit, and when energized pulling the plunger in the opposite direction, valve means to restrict flow through the plunger and conduit to a single direction, automatic intermittent make-and-break means to repeatedly energize said coil, and a concentrically disposed means, extending axially at each end of the plunger, the closures each having a registering means to closely fit the corresponding plunger-carried means, one of said complemental means being formed as a projecting tip and the other as a recess, to trap liquid as a cushion to check movement of the plunger.

3. In combination with a casing defining a closed chamber having only an inlet connection at one end and a discharge connection at its other end, a free plunger reciprocable lengthwise within said chamber, and having a through bore, spring means urging said plunger towards one end of the chamber, an electromagnetic coil surrounding said casing, and when energized urging said plunger towards the opposite end of the chamber, valve means constraining fluid to flow in one direction through the chamber and the plunger's bore, an armature arm attracted to the electromagnetic coil, upon energization of the latter, a spring urging said arm away from the coil, a contact in the coil circuit carried by said arm, a cooperating contact engageable by the arm's contact upon movement of the arm under the influence of the spring, and disengageable upon movement of the arm under magnetic attraction, a tip projecting from the arm, and a recess closely embracing said tip, to trap air and to check the movement of the arm in one direction.

4. A pump comprising a through conduit, an axially bored plunger of magnetic material reciprocable within said conduit, an electromagnet coil surrounding the conduit, and when energized moving the plunger in one direction, means to move the plunger in the opposite direction, upon deenergization of the electromagnet coil, an arm of magnetic material disposed externally of the conduit and carrying a contact point in circuit with the coil, and mounted upon the coil, to be attracted thereto, spring means urging the arm at all times away from the coil, and a complemental contact in the coil circuit, disposed to be contacted by the arm's contact only when the arm is moved away from the coil, and yieldably mounted to move with the arm upon their engagement, away from the coil under the impetus of the spring-urged arm, and towards the coil under the reaction of its own yieldable mounting when such impetus is spent.

5. A pump comprising a through conduit, an axially bored plunger of magnetic material reciprocable within said conduit, an electromagnet coil surrounding the conduit, and when energized moving the plunger in one direction, means to move the plunger in the opposite direction, upon deenergization of the electromagnet coil, an arm of magnetic material carrying a contact point in circuit with the coil, and mounted upon the coil, to be attracted thereto, means urging the arm away from the coil, a complemental contact in the coil circuit, disposed to be contacted by the arm's contact when the arm is moved away from the coil, and yieldably mounted to move with the arm upon their engagement, a projection carried upon the arm, and a pocket disposed adjacent the coil, of a size and shape to closely embrace said projection, and to check movement of the arm.

6. In a pump, in combination, a casing defining a pump chamber and having valve-controlled inlet and outlet ports, a plunger of magnetic material reciprocable to effect a pumping action through said chamber, an electromagnetic coil disposed to attract said plunger when energized, to effect its reciprocation, a pair of contacts in the electromagnet's circuit, a separate pivoted arm carrying each of said contacts and both concentrically mounted, spring means urging the first of said arms and its contact towards the second arm, and into engagement with the latter's contact, said first arm being of magnetic material and disposed to be attracted by the electromagnet, when energized, in opposition to its spring, to break contact, and a spring acting upon the second arm and yieldable under impact of the first arm, when the latter is returned to contacting position, and by its reaction urging the second arm in the direction of movement of the first arm and holding the contacts closed for an appreciable period as the first arm is again attracted by reenergization of the electromagnet.

NATHAN C. PRICE.